US010037306B2

(12) United States Patent
Lin et al.

(10) Patent No.: US 10,037,306 B2
(45) Date of Patent: Jul. 31, 2018

(54) APPROXIMATION OF NON-LINEAR FUNCTIONS IN FIXED POINT USING LOOK-UP TABLES

(71) Applicant: QUALCOMM Incorporated, San Diego, CA (US)

(72) Inventors: Dexu Lin, San Diego, CA (US); Edward Liao, San Diego, CA (US); Somdeb Majumdar, Mission Viejo, CA (US); Aaron Lamb, San Diego, CA (US); Karamvir Chatha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/255,015

(22) Filed: Sep. 1, 2016

(65) Prior Publication Data
US 2018/0060278 A1    Mar. 1, 2018

(51) Int. Cl.
*G06F 1/02* (2006.01)
*G06F 17/17* (2006.01)

(52) U.S. Cl.
CPC .................................. *G06F 17/17* (2013.01)

(58) Field of Classification Search
CPC ........................................................ G06F 17/17
USPC ................................................. 708/270–277
See application file for complete search history.

(56) References Cited

U.S. PATENT DOCUMENTS

| 7,366,748 | B1 | 4/2008 | Tang et al. |
| 7,509,362 | B2 | 3/2009 | Singhal |
| 8,356,066 | B1 | 1/2013 | Verma |
| 9,069,686 | B2 | 6/2015 | Azadet et al. |
| 9,207,910 | B2 | 12/2015 | Azadet et al. |
| 9,252,712 | B2 | 2/2016 | Li et al. |
| 2010/0198895 | A1 | 8/2010 | Azadet et al. |

OTHER PUBLICATIONS

International Search Report and Written Opinion—PCT/US2017/045622—ISA/EPO—dated Apr. 5, 2018.
Muller J-M., "Elementary Functions Algorithms and Implementation, Passage", Birkhaeuser, Basel, CH, 1997, pp. 143-145, XP001152382.

(Continued)

*Primary Examiner* — Tan V. Mai
(74) *Attorney, Agent, or Firm* — Arent Fox LLP

(57) ABSTRACT

Computing a non-linear function $f(x)$ in hardware or embedded systems can be complex and resource intensive. In one or more aspects of the disclosure, a method, a computer-readable medium, and an apparatus are provided for computing a non-linear function $f(x)$ accurately and efficiently in hardware using look-up tables (LUTs) and interpolation or extrapolation. The apparatus may be a processor. The processor computes a non-linear function $f(x)$ for an input variable x, where $f(x)=g(y(x),z(x))$. The processor determines an integer n by determining a position of a most significant bit (MSB) of an input variable x. In addition, the processor determines a value for $y(x)$ based on a first look-up table and the determined integer n. Also, the processor determines a value for $z(x)$ based on n and the input variable x, and based on a second look-up table. Further, the processor computes $f(x)$ based on the determined values for $y(x)$ and $z(x)$.

49 Claims, 12 Drawing Sheets

(56) References Cited

OTHER PUBLICATIONS

Schulte M.J., et al., "Hardware Design for Exactly Rounded Elementary Functions", IEEE Transactions On Computers, vol. 43, No. 8, Aug. 1994 (Aug. 1994), pp. 964-973. XP000457356, ISSN: 0018-9340. DOI: 10.1109/12.295858.

Szabo T., et al., "An efficient hardware implementation of feed-forward neural networks", Electronic Publishing, Artistic Imaging, And Digital Typography, [Lecture Notes in Computer Science, ISSN 0302-9743], Springer Verlag, DE, vol. 2070, 2001, pp. 300-313, XP002409092.

APPROXIMATION OF NON-LINEAR FUNCTIONS IN FIXED POINT USING LOOK-UP TABLES

FIELD

The present disclosure relates generally to mathematical approximation, and more particularly, to an approximation of non-linear functions in fixed-point arithmetic using look-up tables.

BACKGROUND

Computing a non-linear function $f(x)$ in hardware or embedded systems can be very complex and resource intensive. Typically, a Taylor series expansion is used to approximate a non-linear function. However, approximation of a non-linear function $f(x)$ using Taylor series expansion may be computationally inefficient, as such approximation may require significant memory and processing time. There is currently a need for techniques to calculate an arbitrary nonlinear function more efficiently in hardware in which such techniques provide increased accuracy of the computation of the nonlinear function while reducing memory usage and/or processing time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Computing a non-linear function $f(x)$ in hardware or embedded systems can be very complex and resource intensive. Typically, a Taylor series expansion is used to approximate a non-linear function. However, approximation of a non-linear function $f(x)$ using Taylor series expansion may be computationally inefficient, as such approximation may require significant memory and processing time.

One or more of the embodiments of the present disclosure may be used to calculate nonlinear functions more accurately and efficiently in hardware using look-up tables (LUTs) and interpolation or extrapolation. Determining the value of a nonlinear function $f(x)$ for any value x may require time and/or memory space. For certain applications, aspects of the present disclosure may reduce the computation time and/or memory requirements for calculating certain nonlinear functions.

In an aspect of the disclosure, a method, a computer-readable medium, and an apparatus are provided. The apparatus may be a processor. The processor computes a non-linear function $f(x)$ for an input variable x, where $f(x)=g(y(x),z(x))$. The processor determines an integer n by determining a position of a most significant bit (MSB) of an input variable x. In addition, the processor determines a value for $y(x)$ based on a first look-up table and the determined integer n. In addition, the processor determines a value for $z(x)$ based on n and the input variable x, and based on a second look-up table. Further, the processor computes $f(x)$ based on the determined values for $y(x)$ and $z(x)$.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
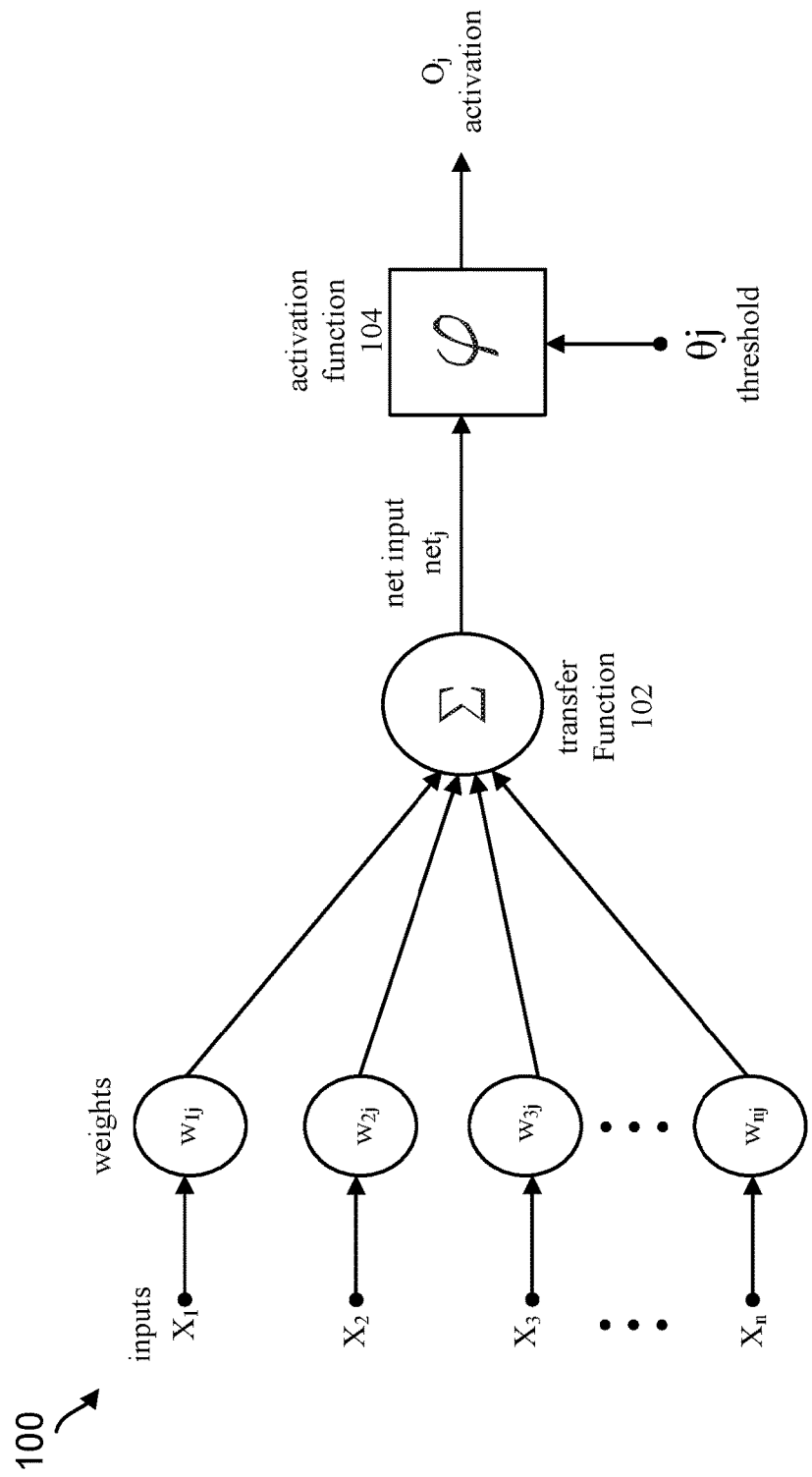
FIG. 1 is a diagram illustrating a single layer neural network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of mathematical approximation methods will now be presented with reference to various system. These systems and methods will be described in the following detailed description and illustrated in the accompanying drawings by various blocks, components, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a single layer neural network 100. One or more embodiments of the present disclosure may be used to increase the speed and to reduce the memory requirements for repetitive computations. For example, as shown in FIG. 1, in a single layer neural network 100, the initial inputs ($x_1$ to $x_n$) may be static signals such as images or may be dynamic signals such as video or sensor data, and the output ($O_j$) may be a classification signal or a reconstruction signal. A common element of the transformation of the input ($x_1$ to $x_n$) to the output ($O_j$) in a single layer neural network 100, for example, may involve a transfer function 102 followed by an activation function 104. The activation function 104 may be designed to force the result of the transfer function 102 into a finite range, for example, $\{-1, 1\}$. Examples of the activation function 104 in a neural network are the tan h(•) and sigmoid functions. In a typical multi-layer neural network, a single pass through all the layers may involve tens of thousands of instances where an activation function 104 is applied. Therefore, the computation of the activation function 104 in a neural network may be a significant contributor to network latency.

One or more of the embodiments of the present disclosure may be used to calculate nonlinear functions more accurately and efficiently in hardware using look-up tables (LUTs) and interpolation or extrapolation. Determining the value of a nonlinear function $f(x)$ for any value x may require time and/or memory space. For certain applications, aspects of the present disclosure may reduce the computation time and/or memory requirements for calculating certain nonlinear functions. By way of example and not limitation, computation of $f(x)$=tan h(x), useful as an activation function in a neural network, will be used to illustrate various aspects of the disclosure.

Typically, a Taylor series expansion is used to approximate the non-linear function $f(x)$. However, the Taylor polynomials may only provide accurate approximations over a finite range of input values. Also, approximation of non-linear function $f(x)$ using Taylor series expansion may be computationally inefficient, as such approximation may require significant memory and processing time. Alternatively, LUTs containing precomputed results of the non-linear function $f(x)$ in conjunction with interpolation/extrapolation using the precomputed results of $f(x)$ from the LUTs may be used to approximate the non-linear function $f(x)$. However, the results of the interpolation/extrapolation may not provide sufficient accuracy. In an aspect, spline interpolation may be used to approximate the non-linear function $f(x)$. However, any other interpolation techniques, for example, rational interpolation, multivariate interpolation, or the like, can also be used to approximate the non-linear function $f(x)$ in fixed point.

In an aspect, spline interpolation of a non-linear function $f(x)$ may employ a low-degree polynomial for each segment of a plurality of segments used to approximate the non-linear function $f(x)$. For a given nonlinear function $f(x)$, a larger input range of x may require more segments to approximate the nonlinear function with a certain accuracy than when the nonlinear function is approximated over a smaller input range of x. In spline interpolation, each segment may be approximated by a polynomial. The polynomials of the segments may be chosen such that the polynomials fit smoothly together. In an aspect, cubic splines (polynomials of degree three), which may be used to approximate any function, may be utilized in the spline interpolation.

In one aspect, the approximation of a non-linear unction $f(x)$ with a large input range using spline interpolation may require a large number of splines/segments to cover the large input range and may use a LUT to store precomputed values of the coefficients of the nonlinear function $f(x)$ for each spline/segment. Therefore, in such approximation, the use of a LUT may require a large memory space to store the LUT. In an aspect, to reduce memory space, one or more contiguous segments, in which the value of the non-linear function $f(x)$ does not change frequently, may be combined into a larger segment represented by a single spline polynomial to reduce the total number of segments, which may reduce the memory requirements. In an aspect, the boundaries of segments may be restricted to powers of 2, instead of using segments of equal size or of arbitrary sizes. When the boundaries of segments occur at a power of 2, identification of the segment that contains the value of the input variable x of the non-linear function $f(x)$ may be determined at a lower computation cost based on a fixed point representation, e.g., binary representation, of the input variable x for the non-linear function $f(x)$.

In one aspect, the LUTs corresponding to the exponentially spaced segments (e.g., the boundaries of segments restricted to powers of 2) of the non-linear function $f(x)$ may allow a reduced complexity look-up of the segment that includes value of the input variable x. Utilizing exponentially spaced segments may also allow for higher precision calculation of the nonlinear function $f(x)$ for a certain range of the input and lower precision calculation of the nonlinear function $f(x)$ for other values of the input. For example, for activation functions in neural networks (e.g., sigmoid or tan h), the most interesting region may be close to 0. In a neural network, the activation function forces the result of a transfer function into a finite range $\{-1, 1\}$.

One or more of the embodiments of the present disclosure may be used to calculate nonlinear functions more accurately and efficiently in hardware using LUTs and spline interpolation or extrapolation.

Figure 2:
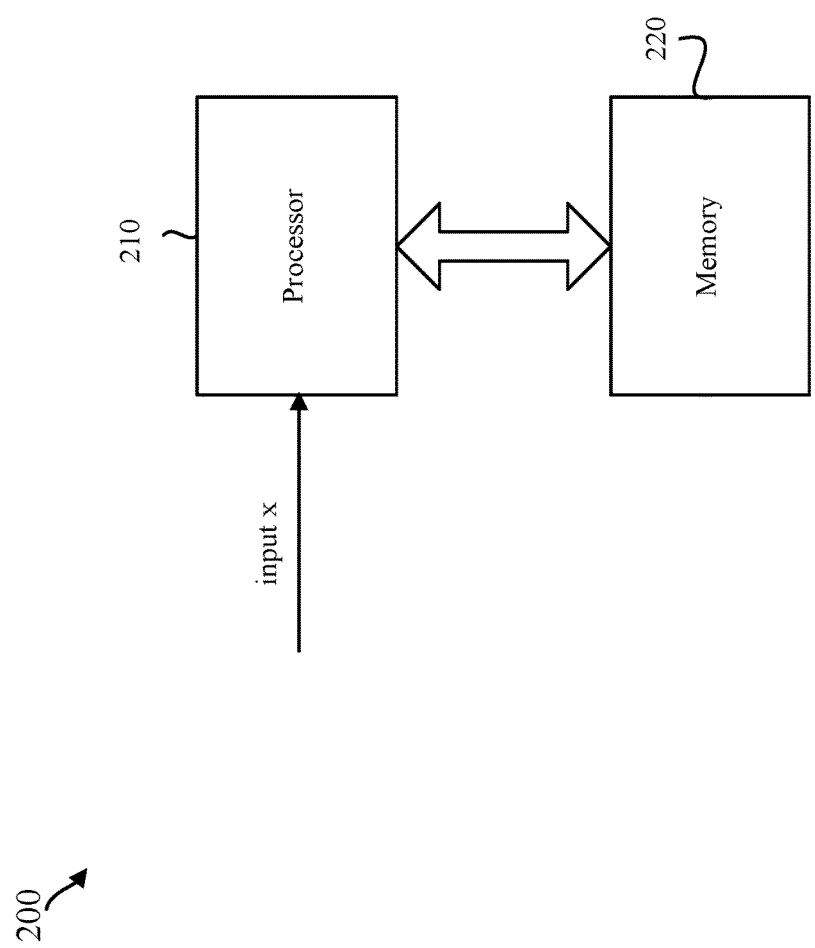
FIG. 2 is a diagram illustrating an exemplary system configured to perform a method to approximate a non-linear function in fixed point.

FIG. 2 is a diagram illustrating an exemplary system 200 configured to perform a method to approximate a non-linear function in fixed-point arithmetic. In one example, the non-linear function may be $f(x)$=tan h(x). In this embodiment, the non-linear function $f(x)$ is approximated using LUTs containing precomputed values of the coefficients of the nonlinear function $f(x)$ for each segment of plurality of segments of $f(x)$ in conjunction with spline interpolation. The system 200 includes a processor 210 for operating on an input data, for example, a value of the input variable x of the non-linear function $f(x)$, and a memory 220. The processor 210 may receive the input variable x and determine the non-linear function $f(x)$ based on one or more LUTs stored in the memory 220.

Figure 3A:
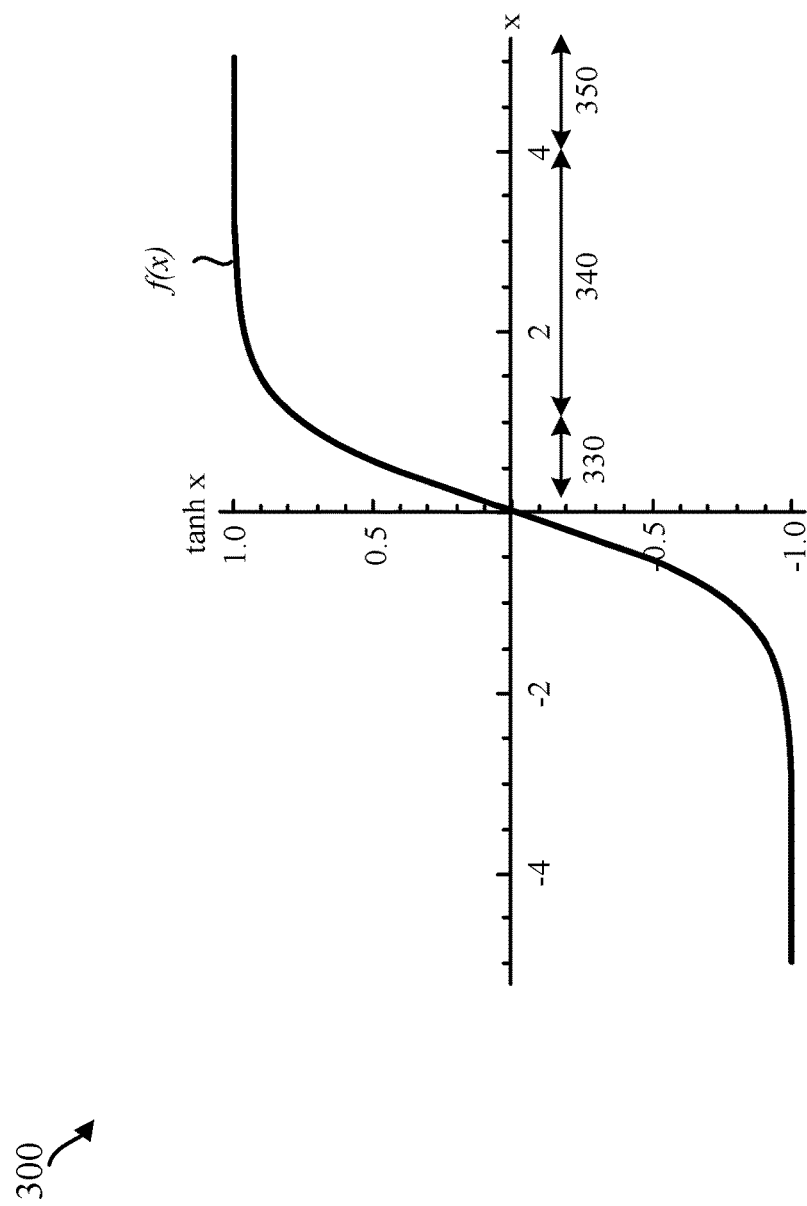
FIG. 3A is a diagram illustrating a graphical representation of an exemplary non-linear function $f(x)=\tan h(x)$.
Figure 3B:
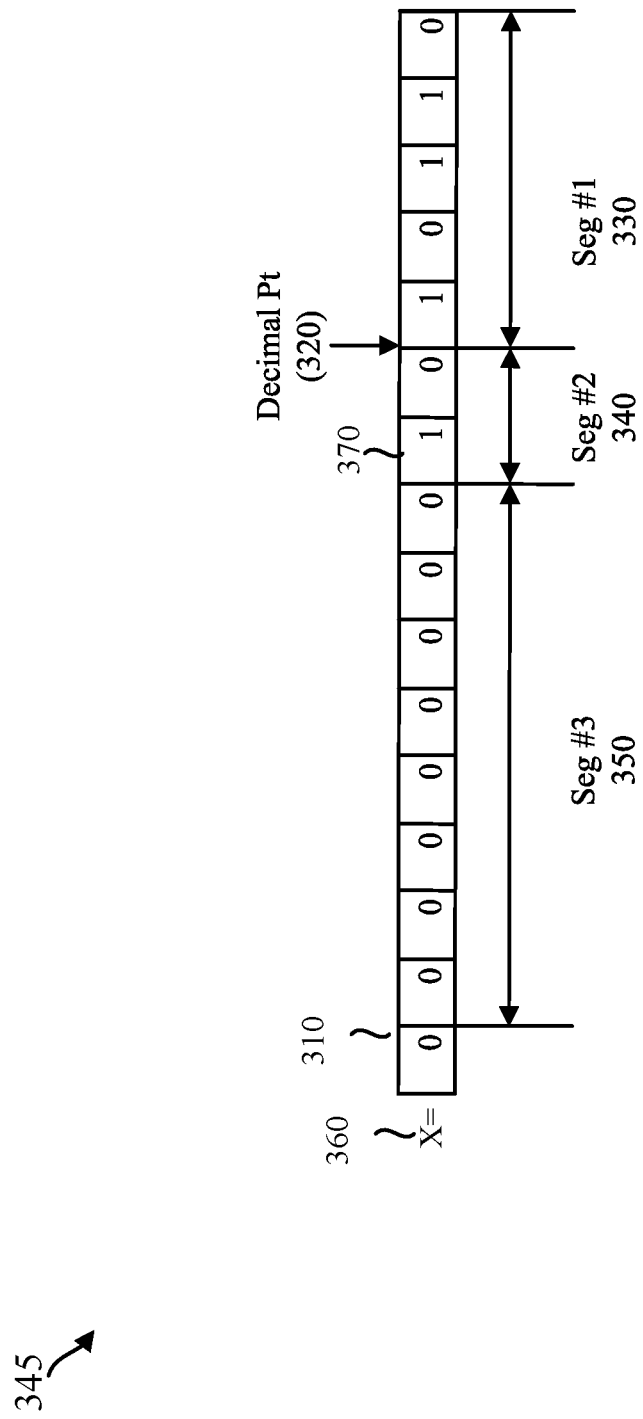
FIG. 3B is a diagram illustrating an input variable of the non-linear function with segment identifiers (IDs) based on the segment boundaries defined by the processor.

FIG. 3A is a diagram 300 illustrating a graphical representation of an exemplary non-linear function $f(x)$=tan h(x). FIG. 3B is a diagram 345 illustrating an input variable of the non-linear function with segment IDs based on the segment boundaries defined by the processor. FIG. 3B specifically illustrates the input variable x=10.10110 (360) represented in fixed point binary domain. The input variable x may be received in binary, decimal, hexadecimal, or some other format. If the input variable x is received in a format other than the binary format, the processor 210 may convert the input variable x to binary format. In some embodiments, the non-linear function $f(x)$ and the corresponding LUTs may be pre-defined and stored in the memory 220.

In one aspect, the non-linear function $f(x)$ may be partitioned into several ranges of input values/segments/splines, where each segment may be approximated by a polynomial. In one embodiment, the segment boundaries of the non-linear function $f(x)$ may be pre-defined and stored in the memory 220. The polynomials of the segments, used to interpolate between the predefined values of $f(x)$ may be chosen such that the polynemials fit smoothly together. In an aspect, cubic splines (polynomials of degree three) may be utilized in the spline interpolation. The coefficients of the cubic of the nonlinear function $f(x)$ for each segment are stored in a corresponding LUT.

In some embodiments, the segments of the non-linear function $f(x)$ may be determined based on the nature of the non-linear function, the range of the input variable x of interest, whether the accuracy may be reduced for certain ranges of x where the non-linear function $f(x)$ is of less interest to the application, or the like. For example, in a neural network, an activation function may be represented by $f(x)$=tan h(x) where the most interesting part of the function is in a range around zero, as the range 0<x<1 of the non-linear function tan h(x) has more variation of the function values and thus may need higher accuracy of calculation. On the other hand, for values of x greater than 4, the value of the function tan h(x) is approximately 1. Thus, the function $f(x)$=tan h(x) for x≥0 may be represented by three segments as follows:

Segment #1: 0≤x<1 (330)
Segment #2: 1≤x<4 (340)
Segment #3: 4≤x<∞ (350)

Once the segments of the non-linear function $f(x)$ are determined, the processor 210 identifies the segment of the non-linear function $f(x)$=tan h(x) that includes the value of the input variable x. For example, to identify the segment of the non-linear function $f(x)$=tan h(x) based on x, the processor 210 may determine the location of the leading 1 of the binary representation of the input variable x=10.10110 (from the MSB side). The location of the leading 1 determines the segment of the non-linear function $f(x)$ in which the value of the input variable x belongs, which in this case is Segment #2 (340). For example, in the current exemplary embodiment, the binary representation of x=10.10110 (360) in the fixed point binary domain can be written in decimal as x=2.6875, which falls within Segment #2 (1≤x<4) (340).

Next, the processor 210 calculates the result of approximation of $f(x)$=tan h(x) for the input variable x=10.10110 (360), using the spline polynomial corresponding to the Segment #2 (340) and the LUT containing precomputed values of the coefficients of the nonlinear function $f(x)$=tan h(x) for each spline/segment. For example, if the spline polynomial representing Segment #2 (340) in which the value of the input variable x belongs is $ax^3+bx^2+cx+d$, the LUT may contain the values of the coefficients a, b, c, and d. The processor 310 may calculate the result of the approximation of $f(x)$=tan h(x) for x=10.10110 (360) using the value of x in conjunction with the values of the coefficients a, b, c, and d from the equation $ax^3+bx^2+cx+d$.

Although, any non-linear function can be accurately approximated using the concept of exponentially spaced segments for splines, the concept as disclosed in the embodiment of FIGS. 2, 3A, 3B, is effective to approximate a non-linear function $f(x)$ efficiently and accurately whose output changes rapidly over a limited range of x. For example, exponentially spaced segments for splines may be used to compute common activation functions in neural networks (e.g., sigmoid or tan h).

Another aspect of the present disclosure may calculate a nonlinear function via spline reuse. For certain classes of functions, e.g., when computing $f(x)=x^\beta$ or $f(x)=\log x$, polynomial approximations for the entire input range may not be necessary. Instead, splines defined for a smaller input range may be reused for the entire input range. Such nonlinear functions may be decomposed by rewriting x=y·z. With such a decomposition, a spline defined for a small range for the entire input range may be reused to approximate the nonlinear function over the entire input range of x. In one embodiment of the spline reuse approximation method, the spline segments may not be exponentially spaced.

Figure 4A:
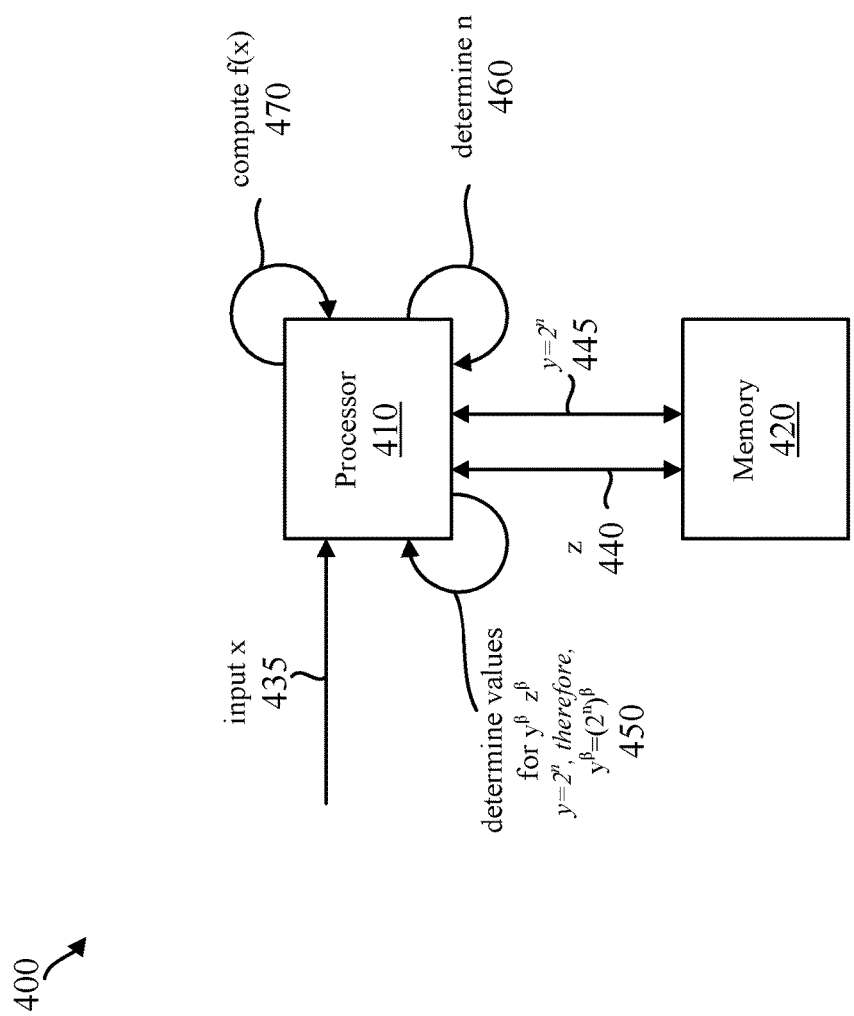
FIG. 4A is a diagram illustrating a general system configured to perform a method to approximate certain non-linear functions using the concept of spline reuse.

FIG. 4A is a diagram illustrating a general system 400 configured to perform a method to approximate certain non-linear functions using the concept of spline reuse. In one example, the non-linear function may be $f(x)=x^\beta$ or $f(x)=\log x$. The system 400 includes a processor 410 for operating on input data, for example, a value for the input variable x (435) of the non-linear function $f(x)$, and a memory 420. The processor 410 may receive the input variable x (435) and determine/compute the non-linear function $f(x)$ (470) based on one or more LUTs stored in the memory 420. The input variable x may be received in binary, decimal, hexadecimal, or some other format. If the input variable x is received in a format other than the binary format, the processor 410 may convert the input variable x to binary format. In some embodiments, the non-linear function $f(x)$ (e.g., $f(x)=x^\beta$ or $f(x)=\log x$, or the like) can be pre-defined and stored in the memory 420 along with the one or more LUTs used for the approximation. The processor

410 may access the non-linear function $f(x)$ and the LUTs from the memory 420 to perform the approximation.

For example, in one embodiment, in order to approximate (470) the non-linear function $f(x)=x^\beta$ (where $\beta$ is a constant and x>0), using the concept of spline reuse, decomposition may be performed on the function $f(x)=x^\beta$ by rewriting $x=y\cdot z$, or $x^\beta=(y\cdot z)^\beta=y^\beta\cdot z^\beta$. Therefore, $x^\beta$ can be determined by determining 450 the values of $y^\beta$ and $z^\beta$. In this example, $y=2^n$ (445), therefore, $y^\beta=(2^n)^\beta$, (n∈I) and z∈(1.0, 2.0). In this case, y is an integer that is a power of 2 and the value of z is a real number between the values of 1 and 2. Therefore, the value of y can be determined 445 by determining 460 the value of n. Once n is determined 460, the processor 410 determines 440 the value of z from the value of input variable x 435. The above decomposition may be useful to approximate $x^\beta$, since this decomposition only uses two LUTs one for $y^\beta$ and another LUT for $z^\beta$. The LUT for the $z^\beta$ is over a limited input range, which may reduce memory space and thus improve processing time. In one embodiment, $z^\beta$ can be computed using cubic spline approximations. For example, for z∈(1.0, 2.0), there may be four equally spaced splines:

1.0≤z<1.25
1.25≤z<1.5
1.5≤z<1.75
1.75≤z<2.0

The LUT 494 for $z^\beta$ may contain precomputed values of the coefficients of the cubic polynomial for each segment (e.g., the values of the coefficients a, b, c, and d from the equation $ax^3+bx^2+cx+d$).

In this exemplary configuration, the non-linear function $f(x)=x^\beta$, the LUTs for $y^\beta$ and $z^\beta$ for different $\beta$ values may be pre-defined and stored in the memory 420. In some configuration, the value of $\beta$ may be received by the memory 420. The processor 410 may access the LUTs for $y^\beta$ and $z^\beta$ for the received $\beta$ value from the memory 420 to perform the approximation using the concept of spline reuse.

Figure 4B:
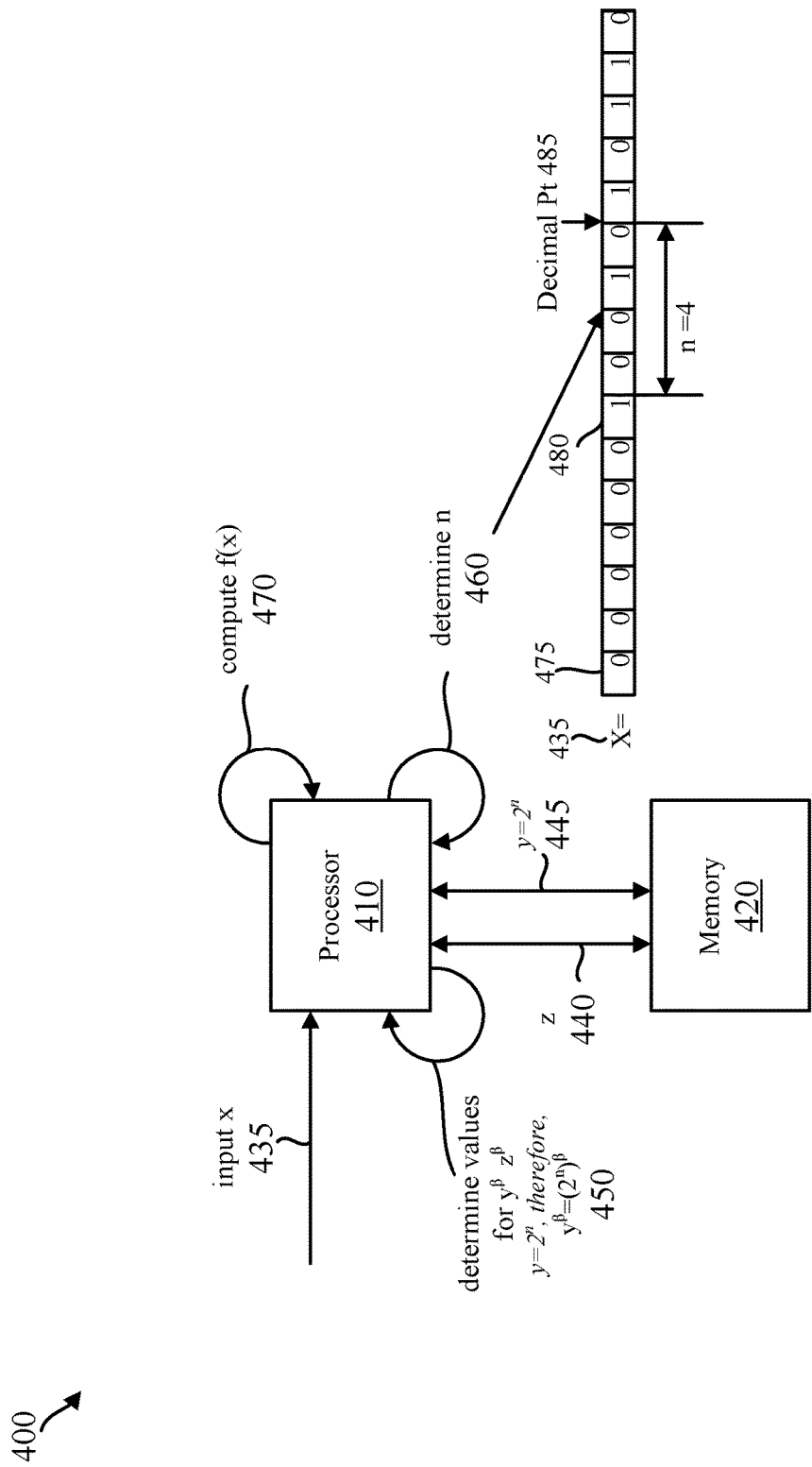
FIG. 4B is a diagram illustrating the input variable in fixed point domain and the computation of a variable from the input, using an embodiment of the spline reuse approximation method of FIG. 4A.
Figure 4C:
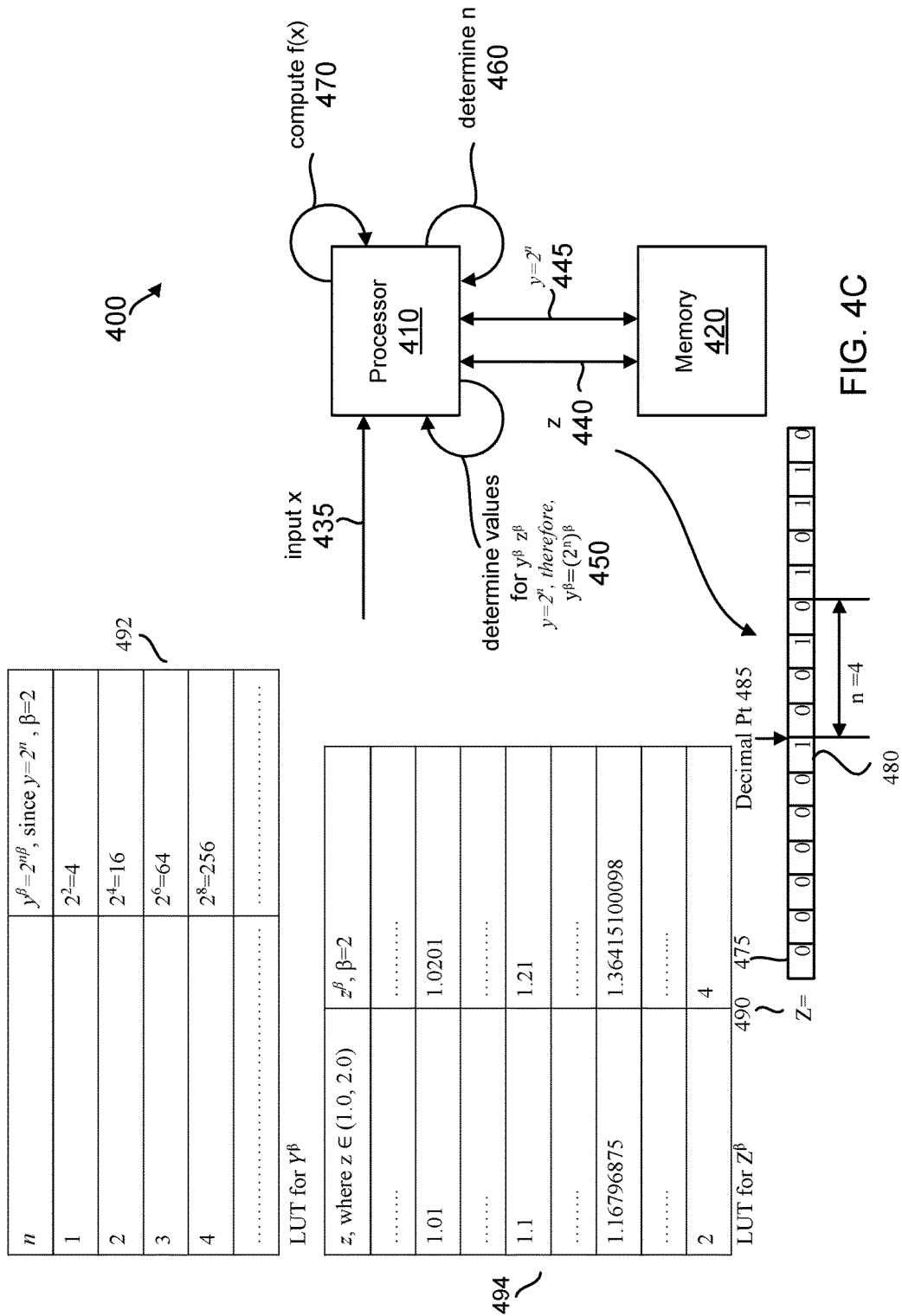
FIG. 4C is a diagram illustrating the computation of the non-linear function, using the spline reuse approximation method of FIG. 4A.

FIG. 4B is a diagram illustrating the input variable in fixed point domain and the computation of a variable from the input, using the spline reuse approximation method of FIG. 4A. FIG. 4C is a diagram illustrating the computation 470 of the non-linear function, using the spline reuse approximation method of FIG. 4A. FIG. 4B specifically illustrates the input variable x=10010.10110 (435) represented in a fixed point binary domain and the computation of a variable n (460) from the input variable x=10010.10110 (435) (or x=18.6875 in decimal). In order to determine n, the processor 410 determines the location of the leading 1 (480) in the input variable x 435 from the MSB 475 side and the location of the decimal point 485 in the input variable x 435. Next, the processor 410 determines 460 the variable n by computing the number of bits (or number of bit shifts) between the location of leading 1 (480) and the location of decimal point 485 in the input variable x 435. For example, in the current case, n=4. Therefore, the leading 1 of the binary representation of the input variable x 435 determines the power of 2, and in turn determines y (445) which is an integer value of $2^n$ using the value of n.

FIG. 4C specifically illustrates the computation 440 of z 490 from the input variable x=10010.10110 (435) based on the variable n. Once, n is determined 460, the processor 410 determines 440 the value of z 490 from the value of input variable x 435, by moving the decimal point 485 in the input variable x=10010.10110 (435) n positions to the left, i.e., next to the leading 1 (480) to obtain z 490. Therefore, as shown in FIG. 4C, in the current exemplary embodiment, the value of z=1.001010110 (490) (z=1.16796875 in decimal, a value in the range of 1 to 2). FIG. 4C also shows the computation of y (445), $y^\beta$, $z^\beta$ (450) and $f(x)=x^\beta$ (470) by computing $y^\beta\cdot z^\beta$, since $x^\beta=y^\beta\cdot z^\beta$.

Once, n and z 490 are computed by the processor 410, the processor 410 determines 445 the value of y, using the value of n=4, since $y=2^n=2^4=16$ (in decimal). Next, the processor 410 retrieves the value of $y^\beta$ for n=4 from a LUT 492 for the $y^\beta$ and the value for $z^\beta$ for z=1.16796875 from a LUT 494 for $z^\beta$. The LUT 492 for $y^\beta$ only contains a finite range of values because y is an integer that is power of 2. The LUT 494 for $z^\beta$ can be reused, that is only one LUT is needed over a finite range for $z^\beta$. Following are two exemplary LUTs for $y^\beta$ and one for $z^\beta$ for $\beta=2$.

| n | $y^\beta = 2^{n\beta}$, since $y = 2^n$, $\beta = 2$ |
|---|---|
| 1 | $2^2 = 4$ |
| 2 | $2^4 = 16$ |
| 3 | $2^6 = 64$ |
| 4 | $2^8 = 256$ |
| ... | ... |

LUT for $Y^\beta$

| z, where z ∈ (1.0, 2.0) | $z^\beta$, $\beta = 2$ |
|---|---|
| ... | ... |
| 1.01 | 1.0201 |
| ... | ... |
| 1.1 | 1.21 |
| ... | ... |
| 1.16796875 | 1.36415100098 |
| ... | ... |
| 2 | 4 |

LUT for $Z^\beta$

The LUT 492 for $y^\beta$ is needed to cover a wide enough dynamic range of the input x 435. The linear increase of the LUT size corresponds to the exponential increase of the input range. Since in this case, $y=2^n$, the LUT is exact and no approximation is needed to compute $y^\beta$. The LUT 494 for $z^\beta$ provides an approximation to the exact value of $z^\beta$ for all z∈(1.0, 2.0).

For the decomposition $x=y\cdot z$, $x^\beta=y^\beta\cdot z^\beta$, the processor 410 computes 470 the value of $x^\beta$ by computing $y^\beta\cdot z^\beta$, for a particular value of $\beta$, (e.g. $\beta=2$). In particular, the processor 410 computes 450 the value of $y^\beta$ using the LUT 492 of $y^\beta$ and the processor 410 computes 450 the value of $z^\beta$ using the LUT 494 of $z^\beta$. The processor 410 then multiplies the computed values of $y^\beta$ and $z^\beta$ to compute 470 the value of $x^\beta$.

A similar decomposition technique may be used to compute the value of $f(x)=\log x$ by rewriting $x=y\cdot z$. Therefore, $\log x=\log y+\log z$. Additionally, the value of log x may be calculated by determining the value of y and z using the above described technique, and using two LUTs, one LUT for log y and another LUT for log z. Again, log z may also be approximated using splines.

In another aspect for computing a nonlinear function by spline reuse and decomposition, an alternative decomposition of the input variable x may be used during evaluation of the function $x^\beta$ (where $\beta$ is a constant, and x>0) by adjusting the range of z. As such, $y^\beta=(2^n)^\beta$ (n=pm, m∈I) and z∈(1.0, $2.0^p$), p∈I. In this case, the value of p=3, which may be predefined and stored in the memory 420. As such, y is an integer that is power of 8, since the value of n is a multiple of 3 (p=3) and the value of z is a real number between the values of 1 and 8. The value of p may be chosen based on the shape of $x^\beta$ curve. For example, for a small $\beta$ value (e.g., 0.001) a large p value may be chosen to cover a wide range of $z^\beta$ values.

Figure 4D:
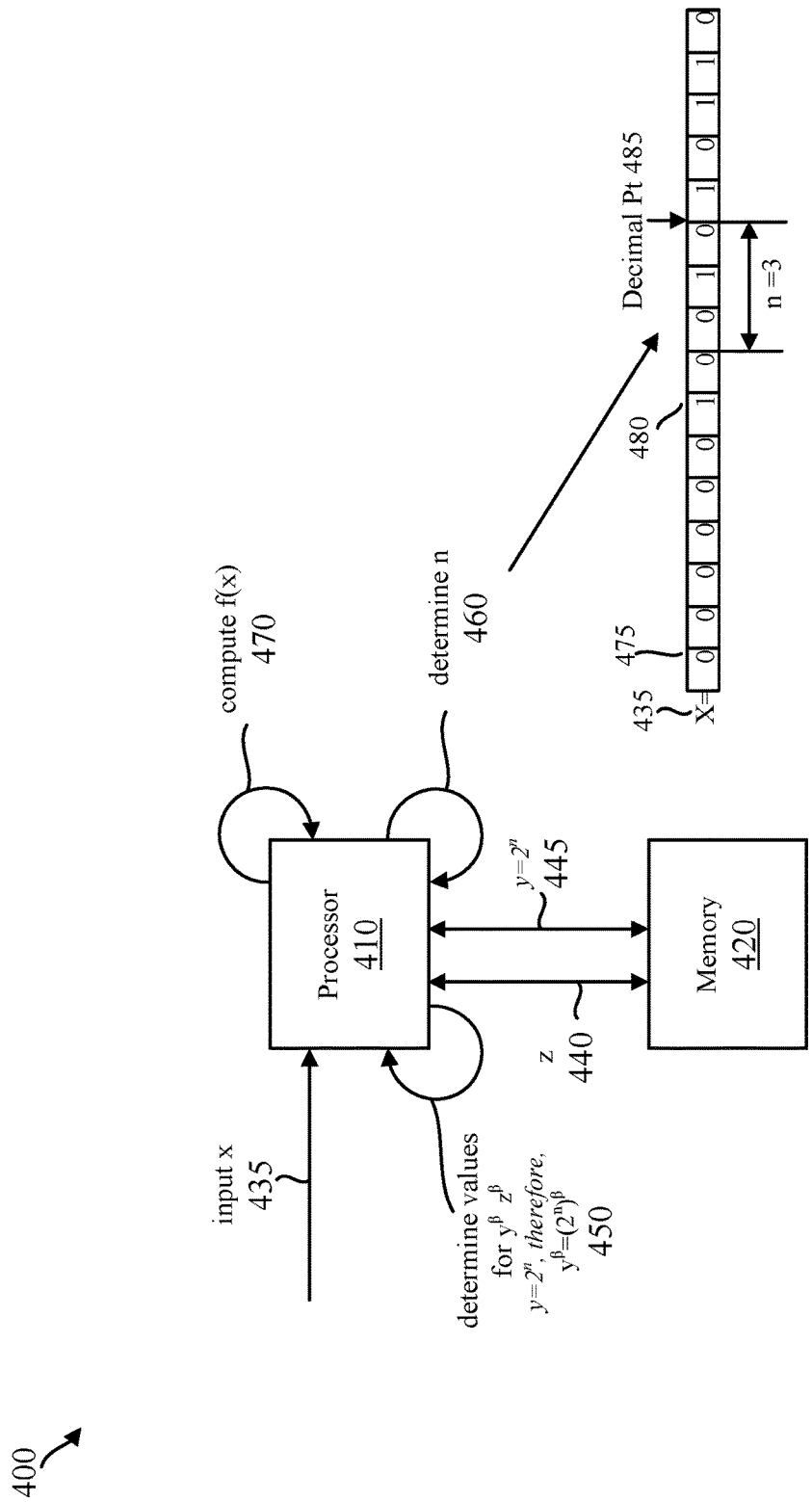
FIG. 4D is a diagram illustrating the input variable in fixed point domain and the computation of a variable from the input, using another embodiment of the spline reuse approximation method of FIG. 4A.

In this exemplary configuration, the non-linear function $f(x)=x^\beta$, the LUTs for $y^\beta$ and $z^\beta$ for different $\beta$ values may be pre-defined and stored in the memory 420. In some configurations, the value of $\beta$ may be received by the memory 420. The processor 410 may access the LUTs for $y^\beta$ and $z^\beta$ for the received $\beta$ value from the memory 420 to perform the approximation using the concept of spline reuse. FIG. 4D is a diagram illustrating the input variable in fixed point binary domain and the computation of a variable from the input, using another embodiment of the spline reuse approximation method of FIG. 4A. FIG. 4D specifically illustrates the input variable x=10010.10110 (435) (or x=18.6875 in decimal) represented in fixed point binary domain and the computation 460 of a variable n from the input variable x=10010.10110 (435). Once the value of p is retrieved from the memory 420 by the processor 410, the processor 410 determines the location of the leading 1 (480) in the input variable x 435 from the MSB 475 side and the location of the decimal point 485 in the input variable x 435. If, it is assumed that, the leading 1 (480) is t positions away from the decimal point 485 in the input variable x 435, the processor 410 computes a variable n as following:

$$n = \left\lfloor \frac{t}{p} \right\rfloor \cdot p, \text{ where } \left\lfloor \frac{t}{p} \right\rfloor = m, \text{ since } n = pm.$$

In this case, t>0 if the leading 1 (480) is to the left of the decimal point 485, and t<0 if the leading 1 (480) is to the right of the decimal point 485. In the current example, for the input variable x=10010.10110 (435)

$$m = \left\lfloor \frac{t}{p} \right\rfloor = \left\lfloor \frac{4}{3} \right\rfloor = 1, \text{ and } n = pm = 3.1 = 3.$$

Figure 4E:
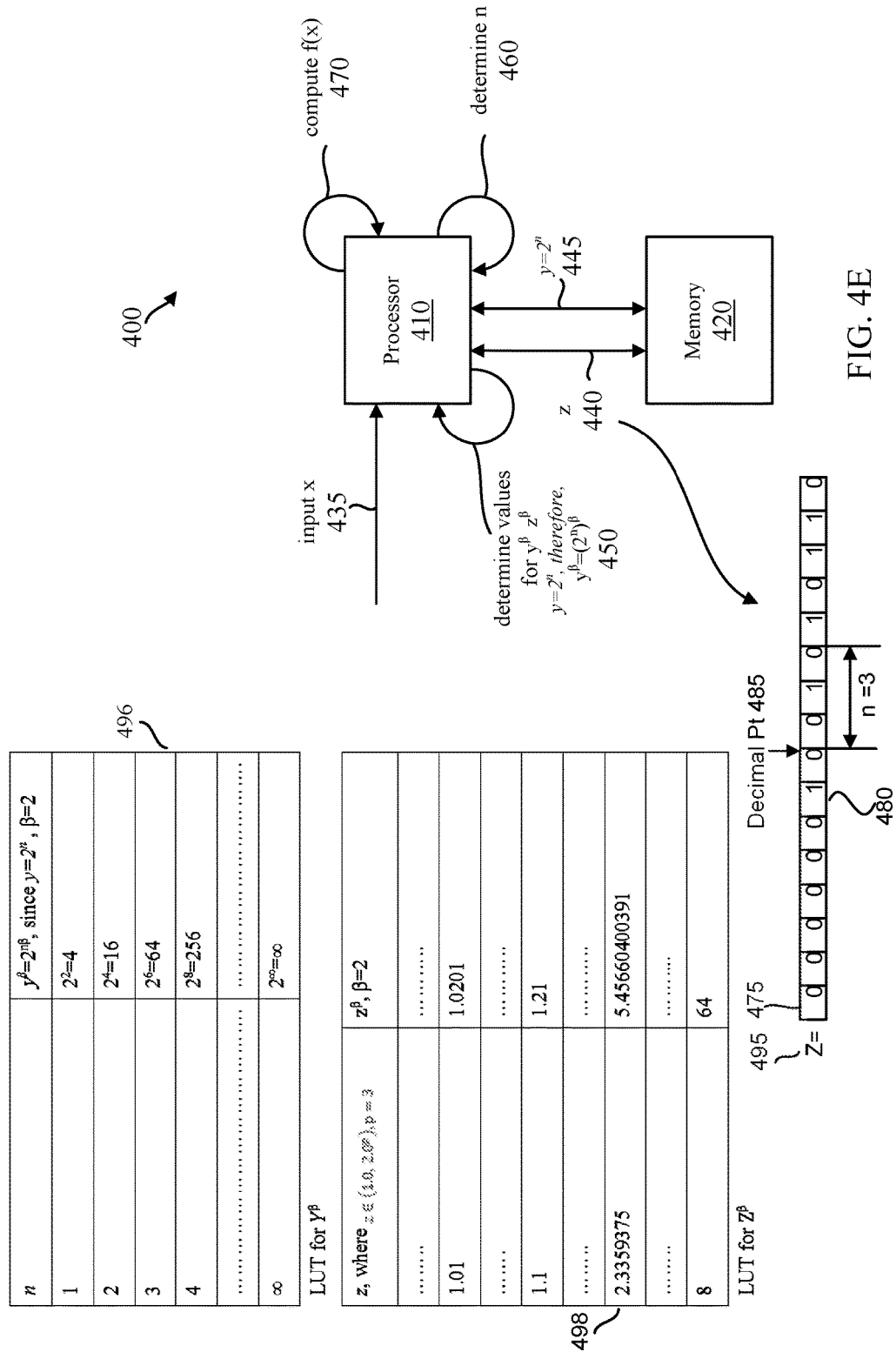
FIG. 4E is a diagram illustrating the computation of the non-linear function, using another embodiment of the spline reuse approximation method of FIG. 4A.

FIG. 4E is a diagram illustrating the computation 470 of the non-linear function $f(x)=x^\beta$, using another embodiment of the spline reuse approximation method of FIG. 4A. FIG. 4E specifically illustrates the computation 440 of z 495 from the input variable x=10010.10110 (435) based on the variable n=3. Once, n is determined 460, the processor 410 determines 440 the value of z 495 from the value of input variable x 435, by moving the decimal point 485 in the input variable x=10010.10110 (335) n positions to the left, i.e., next to the leading 1 480. Therefore, as shown in FIG. 4E, in the current exemplary embodiment, the value of z=10.01010110 (495) (z=2.3359375 in decimal). FIG. 4E also shows the computation 445 of y, $y^\beta$ (450), $z^\beta$ (450) and $f(x)=x^\beta$ (470) by computing $y^\beta \cdot z^\beta$, since $x^\beta=y^\beta \cdot z^\beta$.

Once, n and z are computed by the processor 410, the processor 410 determines 445 the value of y, using the value of n=3, since $y=2^n=2^3=8$ (in decimal). Next, the processor 410 computes 450 the value of $y^\beta$ for n=3 from a LUT 496 for the $y^\beta$ and the value for $z^\beta$ for z=2.3359375 (decimal) from a LUT 498 for $z^\beta$. The LUT 496 for $y^\beta$ only contains a finite range of values because y is an integer that is power of 8. The LUT 498 for $z^\beta$ also contains a finite range of values because z is a real number between the values of 1 and 8. The LUT 498 for $z^\beta$ can be reused, that is only one LUT is needed over a finite range for $z^\beta$. Following are two exemplary LUTs for $y^\beta$ and one for $z^\beta$ for $\beta=2$.

| n | $y^\beta = 2^{n\beta}$, since $y = 2^n$, $\beta = 2$ |
|---|---|
| 1 | $2^2 = 4$ |
| 2 | $2^4 = 16$ |
| 3 | $2^6 = 64$ |
| 4 | $2^8 = 256$ |
| ... | ... |
| $\infty$ | $2^\infty = \infty$ |

LUT for $Y^\beta$

| z, where $z \in (1.0, 2.0^p)$, p = 3 | $z^\beta$, $\beta = 2$ |
|---|---|
| ... | ... |
| 1.01 | 1.0201 |
| ... | ... |
| 1.1 | 1.21 |
| ... | ... |
| 2.3359375 | 5.45660400391 |
| ... | ... |
| 8 | 64 |

LUT for $Z^\beta$

The LUT 496 for $y^\beta$ may cover a wide enough dynamic range of the input. The linear increase of the LUT size corresponds to the exponential increase of the input range. Since in this case, $y=2^n=2^3$ 8, no approximation is needed for the LUT 496 for $y^\beta$. The LUT 498 for $z^\beta$ provides an approximation to the exact value of $z^\beta$ for all $z \in (1.0, 2.0^p)$.

For the decomposition $x=y \cdot z$, $x^\beta=y^\beta \cdot z^\beta$, the processor 410 computes 470 the value of $x^\beta$ by computing $y^\beta \cdot z^\beta$, for a particular value of $\beta$, (e.g. $\beta=2$). In particular, the processor 410 computes 450 the value of $y^\beta$ using the LUT 496 of $y^\beta$ and the processor 410 computes 450 the value of $z^\beta$ using the LUT 498 of $z^\beta$. The processor 410 then multiplies the computed values of $y^\beta$ and $z^\beta$ to compute the value of $x^\beta$. A similar decomposition technique may be used to compute the value of $f(x)=\log x$ by rewriting $x=y \cdot z$. Therefore, log x log y+log z. Additionally, the value of log x may be calculated by determining the value of y and z using the above described technique, and using two LUTs, one LUT for log y and another LUT for log z. Again, log z may also be approximated by using splines.

In one or more embodiments, spline reuse can be used for efficient computations of functions such as $y^\beta$ or log x. For example, spline reuse method of FIGS. 4A-4E can be used to compute the square root x in communications modem or $x^{-3/4}$ in the normalization layer of a DCN. Implementing the exemplary method of spline reuse requires setting up more than one LUTs to perform the calculation. If LUTs can be accessed in the memory, the exemplary method of spline reuse can be detected by observing there are more than one LUTs. The exemplary method of spline reuse can also be detected by setting x to $2^n$ and observe how $x^\beta$ is computed. In an implementation adopting the exemplary method of spline reuse, the output can likely be equal to one of the stored values in the first LUT.

Figure 5:
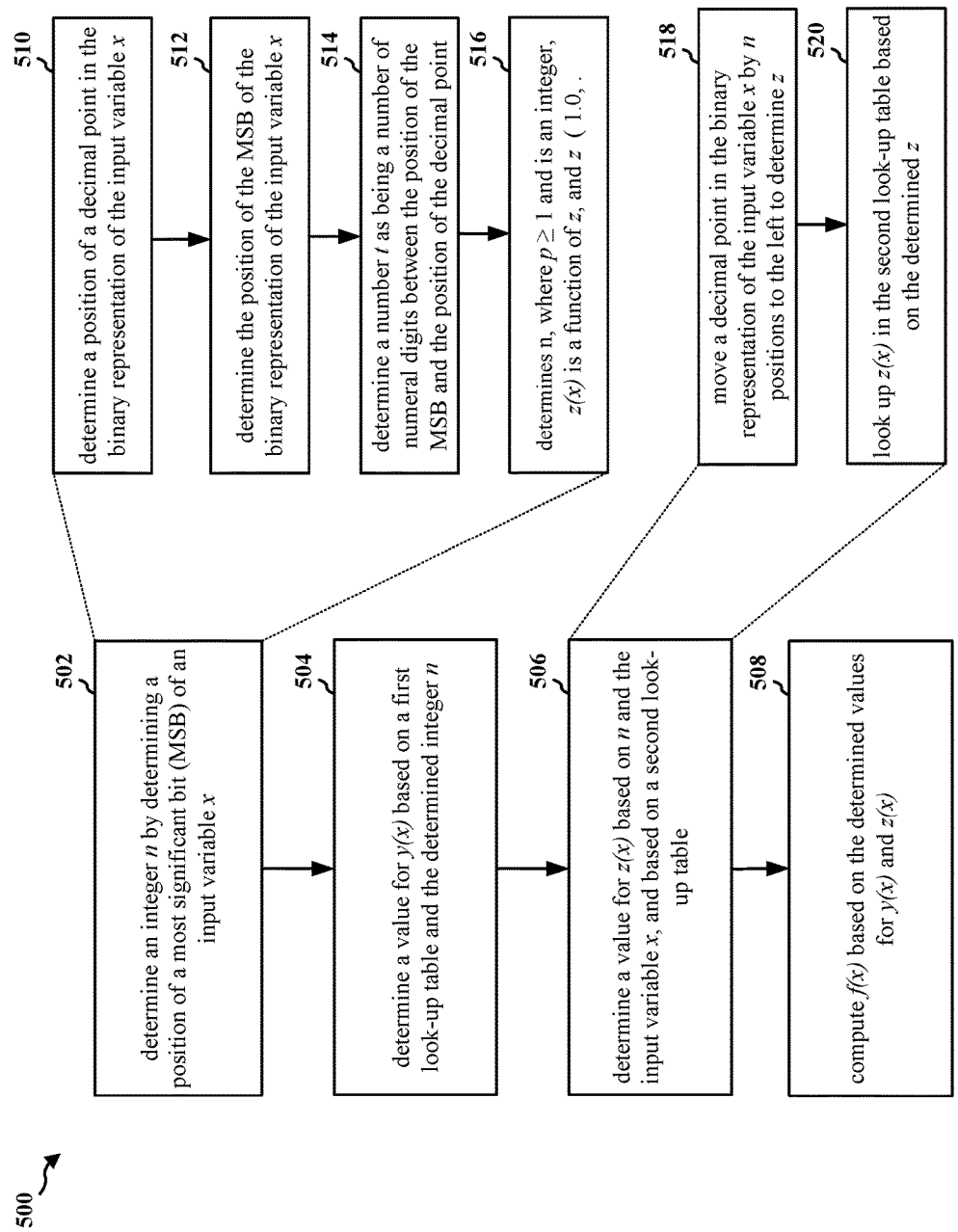
FIG. 5 is a flowchart of a method to approximate certain non-linear functions using the concept of spline reuse.

FIG. 5 is a flowchart 500 of a method to approximate certain non-linear functions (e.g., $f(x)=x^\beta$) using the concept of spline reuse. The method may be performed by a processor (e.g., the processor 410 of FIGS. 4A-4E). In one configuration, the flowchart 500 described in FIG. 5 may be the methods described above with reference to FIGS. 4A-4E.

At 502, the processor determines an integer n (e.g., at 460 as shown in FIGS. 4B and 4D) by determining a position of a most significant bit (MSB) of an input variable x (e.g. 435 in FIGS. 4B-4E) of the non-linear function $f(x)$. In the current exemplary configuration, the non-linear function $f(x)$ may be represented as $f(x)=g(y(x),z(x))$ (e.g., $x^\beta=y^\beta \cdot z^\beta$ as discussed in view of FIGS. 4A-4E).

For example, assume x=10010.10110, as discussed with respect to FIGS. 4B-4E. In that case then, the processor 410 determines the integer n to be equal to 3 by determining a position of the MSB of the input variable x=10010.10110.

At 504, the processor determines a value for y(x) (e.g., $y^\beta$ as in the method of FIGS. 4A-4E) based on a first look-up table and the determined integer n. In one configuration, the first LUT (e.g., LUT 496 of $y^\beta$ of FIG. 4E) may contain different values for y(x) and can be pre-computed by the processor and stored in a memory (e.g., memory 420 of FIGS. 4A-4E). In one embodiment, $y(x)=y^\beta=2^{n\beta}$, where $y=2^n$, $\beta$ is a constant and $\beta \in \mathbb{R}$, $\mathbb{R}$ is a set of real numbers. In such case, the first look-up table provides a mapping between at least one of n or $2^n$, and $2^{n\beta}$, and the processor determines the value for y(x) by determining the value for $2^{n\beta}$ associated with the at least one of n or $2^n$.

For example, referring to the LUT 492 for n=4 of FIG. 4C, the processor 410 may determine a value for y(x) to be equal to 256 based on n=4, for p=1 and the LUT 492.

As another example, referring to the LUT 496 for n=3 of FIG. 4E, the processor 410 may determine a value for y(x) to be equal to 64 based on n=3, for p=3 and the LUT 496.

At 506, the processor determines a value for z(x) based on n and the input variable x, and based on a second look-up table. In one configuration, the second LUT (e.g., LUT 498 of $z^\beta$ of FIG. 4E) may contain different values for z(x) and can be pre-computed by the processor and stored in a memory. In one configuration, the value for z(x) is determined based on a binary representation of the input variable x (e.g., input x 435 in FIGS. 4B-4E). In some configurations, z(x) is a function of z, where $z(x)=z^\beta$, $z \in (1.0, 2.0^p)$, p is an integer. In such case, the second look-up table provides a mapping between z and $z^\beta$, and the processor determines the value for z(x) by determining the value for $z^\beta$ associated with z.

For example, referring to LUT 494 as illustrated in FIG. 4C, the processor 410 may determine a value for z(x) to be equal to 1.36415100098 (decimal) for z=1.16796875 (decimal) based on n=4, x=10010.10110 and the LUT 498. In this case, $z(x)=z^\beta$ is a function of z, and for p=1, $z \in (1.0, 2.0)$.

As another example, referring to LUT 498 as illustrated in FIG. 4E, the processor 410 may determine a value for z(x) to be equal to 5.45660400391 (decimal) for z=2.3359375 (decimal) based on n=3, x=10010.10110 and the LUT 498. In this case, $z(x)=z^\beta$ is a function of z, and for p=3, $z \in (1.0, 8.0)$.

A 508, the processor computes $f(x)$ based on the determined values for y(x) and z(x).

For example, as shown in FIG. 4E, the processor 410 may determine a value of $f(x)=x^\beta$ to be equal to 349.22265625 (decimal) by multiplying the computed values of $y^\beta=64$ (decimal) and $z^\beta=5.45660400391$ (decimal).

In one configuration, in order to determine the integer n (at 502), at 510 the processor determines a position of a decimal point (e.g. 485 in FIGS. 4B-4E) in the binary representation of the input variable x.

For example, as shown with respect to FIG. 4D, for x=10010.10110, the processor 410 may determine the location of the decimal point to be after the fifth bit position to the right from the MSB.

Next, at 512, the processor determines the position of the MSB of the binary representation of the input variable x. In one configuration, the position of the MSB of the binary representation of the input variable x is a position of a leading 1 in the binary representation of the input variable x (e.g., the position of leading 1 480 in input x 435 in FIGS. 4B-4E).

For example, as shown with respect to FIG. 4D, for x=10010.10110, the processor 410 may determine the position of the MSB or the location of the leading 1 as the left most bit of the input variable x.

At 514 the processor determines a number t (e.g., as discussed with respect to FIG. 4D) as being a number of numeral digits between the position of the MSB and the position of the decimal point.

For example, as discussed with respect to FIG. 4D, processor 410 may determine a number t to be equal to 4 as being a number of numeral digits between the position of the leading 1 ($1^{st}$ bit) and the position of the decimal point ($5^{th}$ bit).

Next, at 516, the processor determines n as $$n = \left\lfloor \frac{t}{p} \right\rfloor \cdot p,$$

where p≥1 and is an integer.

For example, as shown in FIG. 4D, processor 410 may determine the value of the integer n to be equal to 3, for an integer p=3.

In one configuration, in order to determine a value for z(x) based on n and the input variable x (at 506), at 518, the processor moves a decimal point in the binary representation of the input variable x by n positions to the left (e.g., at 440 at FIGS. 4D and 4E).

For example, as shown with respect to FIG. 4E, the processor 410 may determine the value of z to be equal to 10.01010110 (2.3359375 in decimal) for n=3 and x=10010.10110 (335).

Next, at 520, the processor look up z(x) in the second look-up table (e.g., LUT 498 of $z^\beta$ of FIG. 4E) based on the determined z (e.g., at 450 in FIGS. 4A-4E).

For example, referring to LUT 498 as illustrated in FIG. 4E, the processor 410 may determine a value for z(x) to be equal to 5.45660400391 (decimal) for z=2.3359375 (decimal) from the LUT 498.

Figure 6:
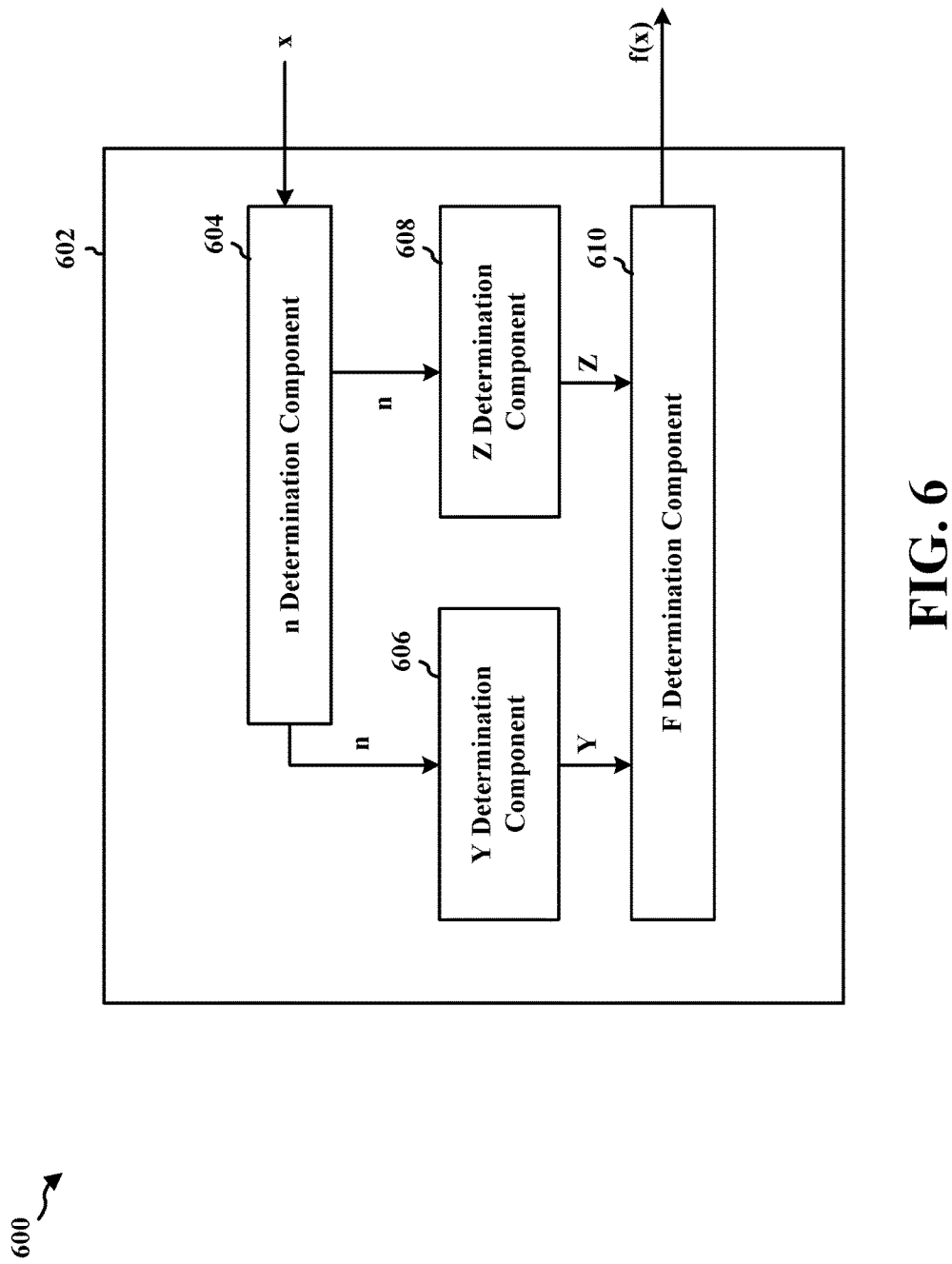
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a processor. The apparatus 602 includes an n determination component 604 that determines an integer n by determining a position of a most significant bit (MSB) of an input variable x of a non-linear function $f(x)$. In the current exemplary configuration, the non-linear function $f(x)$ may be represented as $f(x)=g(y(x),z(x))$.

The apparatus 602 further includes a Y determination component 606 that determines a value for y(x) based on a first LUT and the determined integer n. In one configuration, the first LUT may contain different values for y(x) and can be pre-computed by the Y determination component 606 and stored in a memory in the Y determination component 606. In one embodiment, $y(x)=2^{n\beta}$, where $\beta$ is a constant and $\beta \in \mathbb{R}$, $\mathbb{R}$ is a set of real numbers. In such case, the first LUT provides a mapping between at least one of n or $2^n$, and $2^{n\beta}$, and the Y determination component 606 determines the value for y(x) by determining the value for $2^{n\beta}$ associated with the at least one of n or $2^n$.

The apparatus 602 also includes a Z determination component 608 that determines a value for z(x) based on n and the input variable x, and based on a second LUT. In one configuration, the second LUT may contain different values for z(x) and can be pre-computed by the Z determination component 608 and stored in a memory in the Z determination component 608. In one configuration, the value for z(x) is determined based on a binary representation of the input variable x. In some configurations, z(x) is a function of z, where z(x)=$z^\beta$, z∈(1.0, 2.0$^p$), p is an integer. In such case, the second LUT provides a mapping between z and $z^\beta$, and the Z determination component 608 determines the value for z(x) by determining the value for $z^\beta$ associated with z.

Additionally, the apparatus 602 also includes an F determination component 610 that computes the non-linear function $f(x)$ based on the determined values for y(x) and z(x).

In one configuration, in order to determine the integer n, the n determination component 604 determines a position of a decimal point in the binary representation of the input variable x. Next, the n determination component 604 determines the position of the MSB of the binary representation of the input variable x. In one configuration, the position of the MSB of the binary representation of the input variable x is a position of a leading 1 in the binary representation of the input variable x. Next, the n determination component 604 determines a number t as being a number of numeral digits between the position of the MSB and the position of the decimal point. The n determination component 604 then determines the integer n as $$n = \left\lfloor \frac{t}{p} \right\rfloor \cdot p,$$

where p≥1 and is an integer.

In one configuration, in order to determine a value for z(x) based on n and the input variable x, the Z determination component 608 moves a decimal point in the binary representation of the input variable x by n positions to the left to determine z. Next, the Z determination component 608 looks up z(x) in the second look-up table based on the determined z.

The apparatus 602 may include additional components that perform each of the blocks of the algorithm in the aforementioned flowchart 500 of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
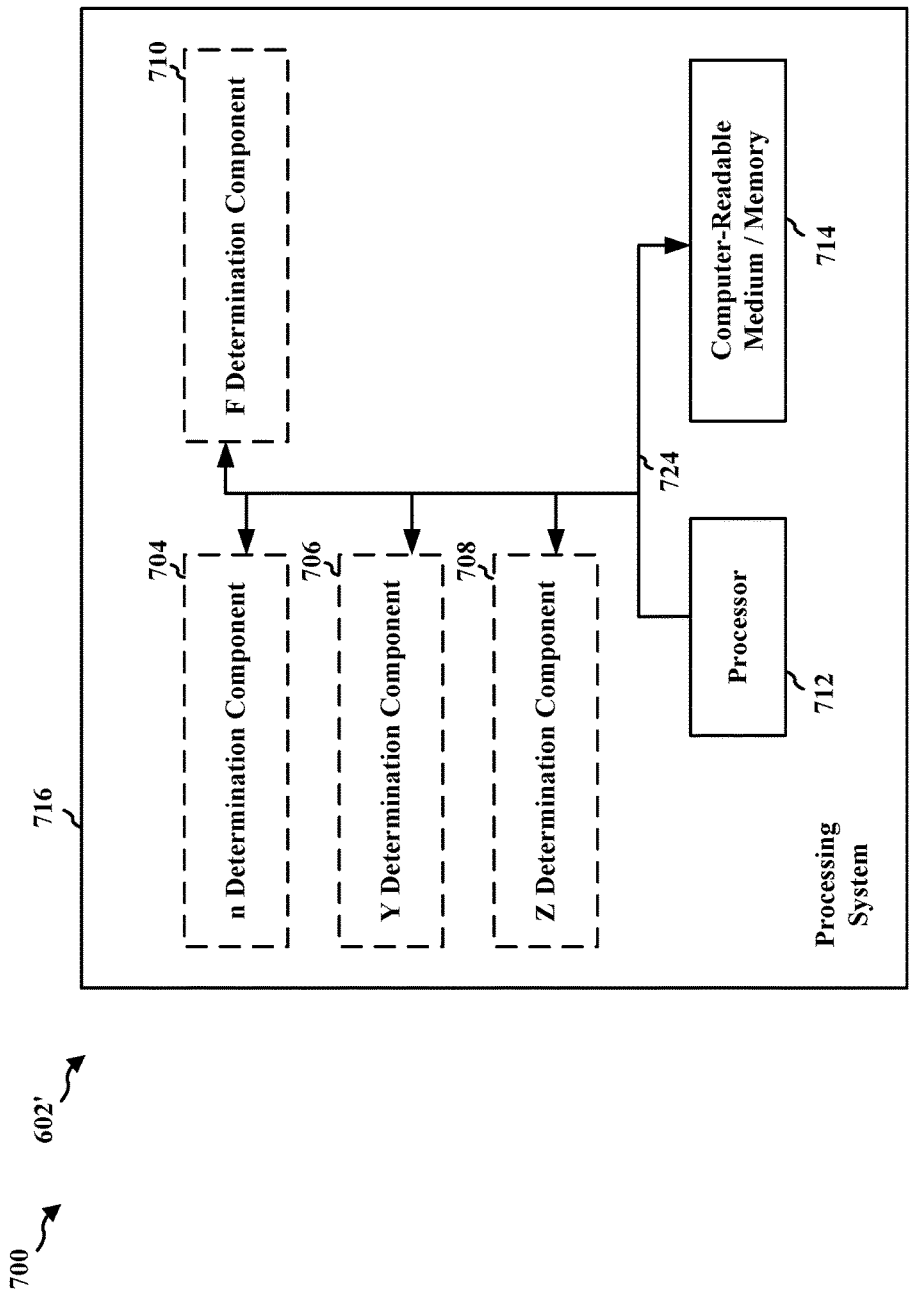
FIG. 7 is a diagram illustrating an example of a hardware implementation for an apparatus employing a processing system.

FIG. 7 is a diagram 700 illustrating an example of a hardware implementation for an apparatus 602' employing a processing system 716. The processing system 716 may be implemented with a bus architecture, represented generally by the bus 724. The bus 724 may include any number of interconnecting buses and bridges depending on the specific application of the processing system 716 and the overall design constraints. The bus 724 links together various circuits including one or more processors and/or hardware components, represented by the processor 712, the n determination component 704, the Y determination component 706, the Z determination component 708, the F determination component 710 and the computer-readable medium/memory 714. The bus 724 may also link various other circuits such as timing sources, peripherals, voltage regulators, and power management circuits, which are well known in the art, and therefore, will not be described any further.

The processor 712 is responsible for general processing, including the execution of software stored on the computer-readable medium/memory 714. The software, when executed by the processor 712, causes the processing system 716 to perform the various functions described supra for any particular apparatus. The computer-readable medium/memory 714 may also be used for storing data that is manipulated by the processor 712 when executing software. The processing system 716 further includes at least one of the components, the n determination component 704, the Y determination component 706, the Z determination component 708 and the F determination component 710. The components may be software components running in the processor 712, resident/stored in the computer readable medium/memory 714, one or more hardware components coupled to the processor 712, or some combination thereof.

In one configuration, the apparatus 602/602' for computing a non-linear function $f(x)$ for an input variable x, where $f(x)=g(y(x),z(x))$, includes means for determining an integer n by determining a position of a most significant bit (MSB) of an input variable x; means for determining a value for y(x) based on a first look-up table and the determined integer n; means for determining a value for z(x) based on n and the input variable x, and based on a second look-up table; and means for computing $f(x)$ based on the determined values for y(x) and z(x). The apparatus 602/602' further includes means for receiving a value for the input variable x via an input device In one configuration, the position of the MSB of the input variable x is the position of the MSB of a binary representation of the input variable x. In some configurations, the value for z(x) is determined based on a binary representation of the input variable x. In one configuration, the position of the MSB of the binary representation of the input variable x is a position of a leading 1 in the binary representation of the input variable x.

In one configuration, the means for determining the integer n further configured to determine a position of a decimal point in the binary representation of the input variable x; determine the position of the MSB of the binary representation of the input variable x; and determine a number t as being a number of numeral digits between the position of the MSB and the position of the decimal point.

In one configuration, means for determining the integer n further configured to determine n as $$n = \left\lfloor \frac{t}{p} \right\rfloor \cdot p,$$

where p≥1 and is an integer, z(x) is a function of z, and z∈(1.0, 2.0$^p$). In some configurations, y(x)=$2^{n\beta}$, where n=pm, $$m = \left\lfloor \frac{t}{p} \right\rfloor,$$

β is a constant, and β∈ℝ, ℝ is a set of real numbers.

In one configuration, the means for determining the value for z(x) based on n further configured to move a decimal point in the binary representation of the input variable x by n positions to the left to determine z; and look up z(x) in the second look-up table based on the determined z.

In one configuration, $f(x)=y(x)*z(x)$, the non-linear function $f(x)$ is equal to $x^\beta$, where $x>0$, $\beta$ is a constant and $\beta \in \mathbb{R}$, $\mathbb{R}$ is a set of real numbers. In some other configurations, $y(x)=2^{n\beta}$. In one configuration, the first look-up table provides a mapping between at least one of n or $2^n$, and $2^{n\beta}$, and the means for determining the value for $y(x)$ further configured to determine the value for $2^{n\beta}$ associated with the at least one of n or $2^{nn}$. In some configurations, $z(x)=z^\beta$, $z \in (1.0, 2.0^p)$, p is an integer. In one configuration, the second look-up table provides a mapping between z and $z^\beta$, and the means for determining the value for $z(x)$ further configured to determine the value for $z^\beta$ associated with z. In some configurations, the input variable x is a positive real number. In some other configurations, $f(x)=y(x)+z(x)$, the non-linear function $f(x)$ is equal to $\log_2 x$, where $x>0$.

The aforementioned means may be one or more of the aforementioned components of the apparatus 602/602' and/or the processing system 716 of the apparatus 602/602" configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of computing, in a processor, a non-linear function $f(x)$ for an input variable x, where $f(x)=g(y(x),z(x))$, the method comprising:
   determining an integer n by determining a position of a most significant bit (MSB) of the input variable x;
   determining a value for $y(x)$ based on a first look-up table and the determined integer n;
   determining a value for $z(x)$ based on n and the input variable x, and based on a second look-up table; and
   computing $f(x)$ based on the determined values for $y(x)$ and $z(x)$.

2. The method of claim 1, wherein the position of the MSB of the input variable x is the position of the MSB of a binary representation of the input variable x.

3. The method of claim 2, wherein the position of the MSB of the binary representation of the input variable x is a position of a leading 1 in the binary representation of the input variable x.

4. The method of claim 3, wherein the determining the integer n comprises:
   determining a position of a decimal point in the binary representation of the input variable x;
   determining the position of the MSB of the binary representation of the input variable x; and
   determining a number t as being a number of numeral digits between the position of the MSB and the position of the decimal point.

5. The method of claim 4, wherein the determining the integer n further comprises determining n as $$n = \left\lfloor \frac{t}{p} \right\rfloor \cdot p,$$

where $p \geq 1$ and is an integer, $z(x)$ is a function of z, and $z \in (1.0, 2.0^p)$.

6. The method of claim 5, wherein $y(x)=2^{n\beta}$, where $n=pm$, $$m = \left\lfloor \frac{t}{p} \right\rfloor,$$

$\beta$ is a constant, and $\beta \in \mathbb{R}$, $\mathbb{R}$ is a set of real numbers.

7. The method of claim 2, wherein the determining the value for $z(x)$ based on n comprises:
   moving a decimal point in the binary representation of the input variable x by n positions to the left to determine z; and
   looking up $z(x)$ in the second look-up table based on the determined z.

8. The method of claim 1, wherein the value for $z(x)$ is determined based on a binary representation of the input variable x.

9. The method of claim 1, further comprising receiving by the processor a value for the input variable x via an input device.

10. The method of claim 1, wherein $f(x)=y(x)*z(x)$, the non-linear function $f(x)$ is equal to $x^\beta$, where $x>0$, $\beta$ is a constant and $\beta \in \mathbb{R}$, $\mathbb{R}$ is a set of real numbers.

11. The method of claim 10, wherein $y(x)=2^{n\beta}$.

12. The method of claim 11, wherein the first look-up table provides a mapping between at least one of n or $2^n$, and $2^{n\beta}$, and the determining the value for $y(x)$ comprises determining the value for $2^{n\beta}$ associated with the at least one of n or $2^n$.

13. The method of claim 10, wherein $z(x)=z^\beta$, $z \in (1.0, 2^p)$, p is an integer.

14. The method of claim 13, wherein the second look-up table provides a mapping between z and $z^\beta$, and the determining the value for $z(x)$ comprises determining the value for $2^\beta$ associated with z.

15. The method of claim 1, wherein the input variable x is a positive real number.

16. The method of claim 1, wherein $f(x)=y(x)+z(x)$, the non-linear function $f(x)$ is equal to $\log_2 x$, where x>0.

17. An apparatus for computing a non-linear function $f(x)$ for an input variable x, where $f(x)=g(y(x),z(x))$, comprising:
a memory; and
at least one processor coupled to the memory and configured to:
determine an integer n by determining a position of a most significant bit (MSB) of the input variable x;
determine a value for $y(x)$ based on a first look-up table and the determined integer n;
determine a value for $z(x)$ based on n and the input variable x, and based on a second look-up table; and
compute $f(x)$ based on the determined values for $y(x)$ and $z(x)$.

18. The apparatus of claim 17, wherein the position of the MSB of the input variable x is the position of the MSB of a binary representation of the input variable x.

19. The apparatus of claim 18, wherein the position of the MSB of the binary representation of the input variable x is a position of a leading 1 in the binary representation of the input variable x.

20. The apparatus of claim 19, wherein the at least one processor determines the integer n by:
determining a position of a decimal point in the binary representation of the input variable x;
determining the position of the MSB of the binary representation of the input variable x; and
determining a number t as being a number of numeral digits between the position of the MSB and the position of the decimal point.

21. The apparatus of claim 20, wherein the at least one processor determines the integer n by further determining n as $$n = \left\lfloor \frac{t}{p} \right\rfloor \cdot p,$$

where p≥1 and is an integer, $z(x)$ is a function of z, and $z \in (1.0, 2.0^p)$.

22. The apparatus of claim 21, wherein $y(x)=2^{n\beta}$, where n=pm, $$m = \left\lfloor \frac{t}{p} \right\rfloor,$$

β is a constant, and $\beta \in \mathbb{R}$, $\mathbb{R}$ is a set of real numbers.

23. The apparatus of claim 18, wherein the at least one processor determines the the value for $z(x)$ based on n by:
moving a decimal point in the binary representation of the input variable x by n positions to the left to determine z; and
looking up $z(x)$ in the second look-up table based on the determined z.

24. The apparatus of claim 17, wherein the value for $z(x)$ is determined based on a binary representation of the input variable x.

25. The apparatus of claim 17, wherein the at least one processor is further configured to:
receive a value for the input variable x via an input device.

26. The apparatus of claim 17, wherein $f(x)=y(x)*z(x)$, the non-linear function $f(x)$ is equal to $x^\beta$, where x>0, β is a constant and $\beta \in \mathbb{R}$, $\mathbb{R}$ is a set of real numbers.

27. The apparatus of claim 26, wherein $y(x)=2^{n\beta}$.

28. The apparatus of claim 27, wherein the first look-up table provides a mapping between at least one of n or $2^n$, and $2^{n\beta}$, and the at least one processor determines the value for $y(x)$ by determining the value for $2^{n\beta}$ associated with the at least one of n or $2^n$.

29. The apparatus of claim 26, wherein $z(x)=z^\beta$, $z \in (1.0, 2.0^p)$, p is an integer.

30. The apparatus of claim 29, wherein the second look-up table provides a mapping between z and $z^\beta$, and the at least one processor determines the value for $z(x)$ by determining the value for $z^\beta$ associated with z.

31. The apparatus of claim 17, wherein the input variable x is a positive real number.

32. The apparatus of claim 17, wherein $f(x)=y(x)+z(x)$, the non-linear function $f(x)$ is equal to $\log_2 x$, where x>0.

33. An apparatus for computing a non-linear function $f(x)$ for an input variable x, where $f(x)=g(y(x),z(x))$, comprising:
means for determining an integer n by determining a position of a most significant bit (MSB) of the input variable x;
means for determining a value for $y(x)$ based on a first look-up table and the determined integer n;
means for determining a value for $z(x)$ based on n and the input variable x, and based on a second look-up table; and
means for computing $f(x)$ based on the determined values for $y(x)$ and $z(x)$.

34. The apparatus of claim 33, wherein the position of the MSB of the input variable x is the position of the MSB of a binary representation of the input variable x.

35. The apparatus of claim 34, wherein the position of the MSB of the binary representation of the input variable x is a position of a leading 1 in the binary representation of the input variable x.

36. The apparatus of claim 35, wherein the means for determining the integer n further configured to:
determine a position of a decimal point in the binary representation of the input variable x;
determine the position of the MSB of the binary representation of the input variable x; and
determine a number t as being a number of numeral digits between the position of the MSB and the position of the decimal point.

37. The apparatus of claim 36, wherein the means for determining the integer n further configured to determine n as $$n = \left\lfloor \frac{t}{p} \right\rfloor \cdot p,$$

where p≥1 and is an integer, $z(x)$ is a function of z, and $z \in (1.0, 2.0^p)$.

38. The apparatus of claim 37, wherein $y(x)=2^{n\beta}$, where n=pm, $$m = \left\lfloor \frac{t}{p} \right\rfloor,$$

β is a constant, and ∈ℝ, ℝ is a set of real numbers.

39. The apparatus of claim 34, wherein the means for determining the value for z(x) based on n further configured to:
  move a decimal point in the binary representation of the input variable x by n positions to the left to determine z; and
  look up z(x) in the second look-up table based on the determined z.

40. The apparatus of claim 33, wherein the value for z(x) is determined based on a binary representation of the input variable x.

41. The apparatus of claim 33, further comprising means for receiving a value for the input variable x via an input device.

42. The apparatus of claim 33, wherein $f(x)=y(x)*z(x)$, the non-linear function $f(x)$ is equal to $x^\beta$, where x>0, β is a constant and β∈ℝ, ℝ is a set of real numbers.

43. The apparatus of claim 42, wherein $y(x)=2^{n\beta}$.

44. The apparatus of claim 43, wherein the first look-up table provides a mapping between at least one of n or $2^n$, and $2^{n\beta}$, and the means for determining the value for y(x) further configured to determine the value for $2^{n\beta}$ associated with the at least one of n or $2^n$.

45. The apparatus of claim 42, wherein $z(x)=z^\beta$, z∈(1.0, $2.0^p$), p is an integer.

46. The apparatus of claim 45, wherein the second look-up table provides a mapping between z and $z^\beta$, and the means for determining the value for z(x) further configured to determine the value for $z^\beta$ associated with z.

47. The apparatus of claim 33, wherein the input variable x is a positive real number.

48. The apparatus of claim 33, wherein $f(x)=y(x)+z(x)$, the non-linear function $f(x)$ is equal to $\log_2 x$, where x>0.

49. A computer-readable medium storing computer executable code for execution on at least one processor, comprising code to:
  determine an integer n by determining a position of a most significant bit (MSB) of an input variable x;
  determine a value for y(x) based on a first look-up table and the determined integer n;
  determine a value for z(x) based on n and the input variable x, and based on a second look-up table; and
  compute a non-linear function $f(x)=g(y(x),z(x))$ based on the determined values for y(x) and z(x).

* * * * *